United States Patent
Healey

(10) Patent No.: US 6,919,704 B1
(45) Date of Patent: Jul. 19, 2005

(54) REVERSE BATTERY PROTECTION FOR A TROLLING MOTOR

(75) Inventor: Robert W. Healey, Tulsa, OK (US)

(73) Assignee: Brunswick Corporation, Lake Forest, IL (US)

( * ) Notice: Subject to any disclaimer, the term of this patent is extended or adjusted under 35 U.S.C. 154(b) by 0 days.

(21) Appl. No.: 10/615,757

(22) Filed: Jul. 9, 2003

(51) Int. Cl.[7] .............................................. G05B 11/28
(52) U.S. Cl. ........................ 318/599; 318/254; 318/266; 318/474; 361/23; 440/73; 327/309; 323/282
(58) Field of Search ...................... 318/138, 139, 318/244, 245, 362, 474, 599, 588; 361/23, 30, 57–59, 81–86, 91, 93.7; 440/1, 6, 7, 73, 84, 87; 327/108, 112, 309, 387; 320/136; 323/282

(56) References Cited

U.S. PATENT DOCUMENTS

| | | | |
|---|---|---|---|
| 4,636,711 A * | 1/1987 | Freymuth | 323/282 |
| 4,644,255 A * | 2/1987 | Freymuth | 323/282 |
| 4,658,203 A * | 4/1987 | Freymuth | 323/282 |
| 5,107,387 A * | 4/1992 | Orton | 361/33 |
| 5,514,942 A * | 5/1996 | Albach et al. | 318/724 |
| 5,939,863 A * | 8/1999 | Miller | 320/136 |
| 5,939,908 A * | 8/1999 | Moore et al. | 327/108 |
| 6,154,081 A * | 11/2000 | Pakkala et al. | 327/309 |
| 6,247,980 B1 * | 6/2001 | Moore et al. | 440/73 |
| 6,252,363 B1 * | 6/2001 | Grady | 318/266 |
| 6,369,533 B1 * | 4/2002 | Mourad et al. | 318/254 |
| 6,483,268 B1 * | 11/2002 | Cummins | 318/362 |
| 6,507,164 B1 * | 1/2003 | Healey et al. | 318/599 |
| 6,556,400 B1 * | 4/2003 | Motz et al. | 361/84 |
| 6,738,239 B2 * | 5/2004 | Petruska | 361/23 |
| 2002/0118496 A1 * | 8/2002 | Petruska | 361/23 |
| 2002/0118497 A1 * | 8/2002 | Petruska | 361/23 |
| 2003/0107340 A1 * | 6/2003 | Kurita et al. | 318/474 |
| 2004/0150927 A1 * | 8/2004 | Strayer et al. | 361/82 |

* cited by examiner

*Primary Examiner*—Paul Ip
(74) *Attorney, Agent, or Firm*—Fellers, Snider, Blankenship, Bailey & Tippens, P.C.

(57) ABSTRACT

A trolling motor having reverse battery protection such that an inadvertent reversal of the battery leads, as when connecting the trolling motor to a battery, will not cause unwanted operation of the trolling motor or damage to the trolling motor circuitry. The reverse battery protection includes a field effect transistor connected in series between one of the battery leads and the motor. The gate terminal of the transistor is in communication with the other battery lead such that, when the battery leads are properly connected to a battery, the transistor is driven to its conducting state and, when the battery leads are reversed, the transistor is driven to its non-conducting state.

4 Claims, 6 Drawing Sheets

REVERSE BATTERY PROTECTION FOR A TROLLING MOTOR

BACKGROUND OF THE INVENTION

1. Field of the Invention

The present invention relates to electrical trolling motors for a fishing boat More particularly, but not by way of limitation, the present invention relates to system to protect the electronic circuitry of a trolling motor from unintentional reverse battery connection.

2. Background of the Invention

Trolling motors are well known in the art and, most often, employ a permanent magnet DC motor. Generally speaking, a trolling motor is a relatively small electric motor coupled to a propeller for propelling a boat, or other water craft, at a relatively low speed. Typically, the electric motor and propeller are positioned at the bottom of a support column rotatably supported by a bracket which is attached to the boat. Traditionally, a control head located at the top of the support column houses electronic circuitry for controlling the motor. In addition, the control head may also house a steering motor and associated circuitry to provide rotation of the support column to steer of the boat when propelled by the trolling motor.

In a typical configuration, a trolling motor receives electrical power from one or more lead-acid batteries, preferably of the type designed for marine or deep cycle use. The trolling motor includes a cable terminating in a pair of color-coded clips for easy connection to the battery. Unfortunately, it is easy to inadvertently reverse the connection of such clips with respect to the polarity of the battery. Such reverse battery connections are a common occurrence. Unprotected, reverse battery connection can cause problems ranging from unanticipated activation of the trolling motor to catastrophic failure of the electronic circuitry controlling the motor and steering system.

To protect against a reverse battery condition, many trolling motors use either a power diode or a diode in conjunction with a relay or contactor. With regard to diode protection, a battery properly connected causes the diode to be forward biased and thus conductive while a reversed battery connection reverse biases the diode so that no current flows. Unfortunately, in the diode protection scheme, all of the trolling motor current must passes through the diode. Diodes which are rated for the maximum current drawn by a typical trolling motor are physically large. In addition, in light of the large currents flowing through the diode, as well as the voltage drop across the diode, significant amounts of heat are produced which must be dissipated in the environment and which reduce the efficiency of the trolling motor.

Alternatively, a contactor may be located in series with the power leads to the trolling motor such that the circuit to the motor and controller is open until the contactor is energized. A relatively small diode placed in series with the relay coil prevents current from flowing through the coil if the battery is reversed but allows current to flow when the battery is properly connected. While this eliminates virtually all of the heat loss of the diode scheme, the relay is somewhat large and costly, and energy is spent energizing the coil.

It is thus an object of the present invention to provide reverse battery protection for a trolling motor which does not induce a significant voltage drop and thus, does not produce significant amounts of heat It is a further object of the present invention to provide reverse battery protection for a trolling motor which is relatively inexpensive.

It is still a further object of the present invention to provide reverse battery protection for a trolling motor which does not increase the overall number of electrical components which support operation of the motor.

SUMMARY OF THE INVENTION

The present invention provides a trolling motor having reverse battery protection which is relatively inexpensive and which results in relatively low losses. The reverse battery protection comprises a power metal oxide field effect transistor ("MOSFET"), connected in series with the primary power supplied to the trolling motor. In a preferred embodiment, MOSFET having an intrinsic diode is connected such that the intrinsic diode is forward biased when the battery is properly connected and reverse biased when the battery is reversed. The gate terminal is connected to the opposite rail of the power supply than that switched by the transistor. Thus, the MOSFET is driven to its on, or conductive, state when the battery is properly connected but is switched to its off state, or non-conductive, state when the battery is connected backwards. Since the device is switched off and the intrinsic diode is reverse biased when the battery is reverse connected, virtually no current will flow. In its conductive state, the MOSFET will typically exhibit very low impedance, on the order of a few milliohms, while in its non-conductive state, the MOSFET will exhibit very high impedance, in fact virtually infinite impedance.

In another aspect of the preferred embodiment the reverse battery protection MOSFET is used to sense trolling motor current to eliminate another component of the trolling motor controller. In a typical trolling motor controller, motor current is sensed to detect over current conditions, such as with a stalled motor. When an over current condition is indicated, the controller reacts by reducing the drive to the motor which in turn reduces the current to a safe level to prevent damage to components of the motor controller or to the motor itself.

In the prior art, motor current is either sensed through a power resistor placed in series with the trolling motor or through a trace on the circuit board having a known resistance. As previously mentioned, since the MOSFET exhibits a resistance of a few milliohms in its conductive state, motor current can be sensed across the reverse battery protection MOSFET in the same manner that it is sensed across any other type of sensing resistor.

Further objects, features, and advantages of the present invention will be apparent to those skilled in the art upon examining the accompanying drawings and upon reading the following description of the preferred embodiments.

DESCRIPTION OF THE PREFERRED EMBODIMENTS

Before explaining the present invention in detail, it is important to understand that the invention is not limited in its application to the details of the construction illustrated and the steps described herein. The invention is capable of other embodiments and of being practiced or carried out in a variety of ways. It is to be understood that the phraseology and terminology employed herein is for the purpose of description and not of limitation.

Figures 1, 2:
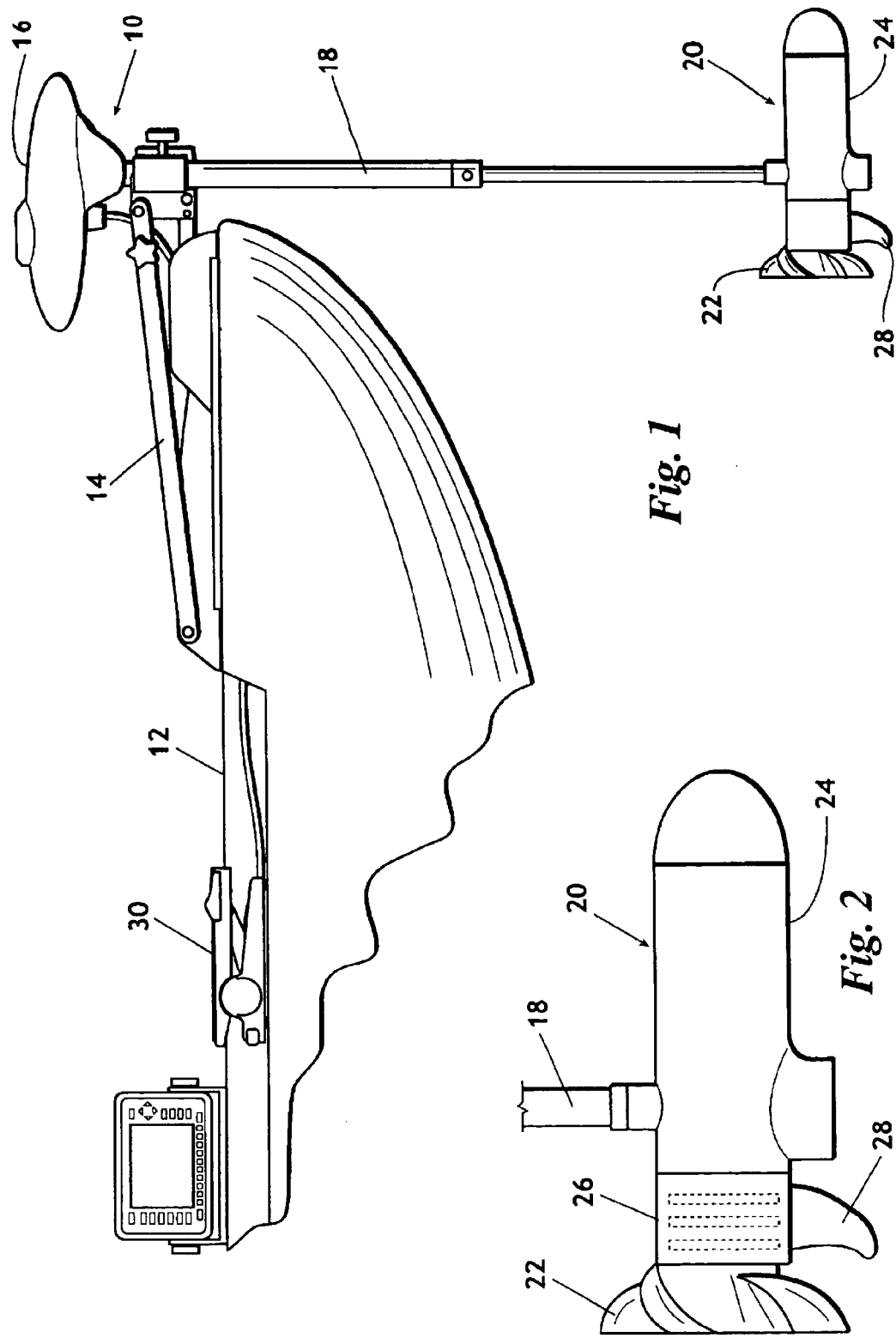
FIG. 1 depicts a trolling motor having the inventive reverse battery protection in its general environment.
FIG. 2 provides an elevation view of the motor housing of a trolling motor having the inventive reverse battery protection.

Referring now to the drawings, wherein like reference numerals indicate the same parts throughout the several views, a trolling motor 10 having reverse battery protection is shown in its general environment in FIG. 1. Typically trolling motor 10 is rotatably mounted to a fishing boat 12 by a mount 14. Mount 14 allows the trolling motor to be placed in the water, as shown in FIG. 1, or to be laid on the deck of boat 12 when not in use. Preferably, trolling motor 10 includes: head 16 which typically houses a steering mechanism and associated control circuitry, if motor 10 is so equipped; a support column 18 extending from head 16 downward through the mount 14 and into the water to support motor assembly 20 in a submerged position. Propeller 22 connects to motor assembly 20 to propel the boat. Fin 28 improves the steering performance of trolling motor 10 and protects propeller 22 from submerged obstacles. The trolling motor speed and steering control may be provided by a foot pedal 30, a hand control (not shown), an autopilot (not shown), or the like.

With further reference to FIG. 2, motor assembly 20 includes: housing 24; motor 48 (FIG. 7) housed in housing 24, which in turn rotates propeller 22; and controller assembly 26 for electrically driving the motor 48. Preferably, electrical wires (not shown) originate in head 16 and are routed through support column 18 to supply electrical power to controller 26 and ultimately to the motor 48. Preferably, controller 26 utilizes pulse width modulation (PWM) to control the voltage applied to the motor, and hence, to control the speed of the motor.

Figure 7:
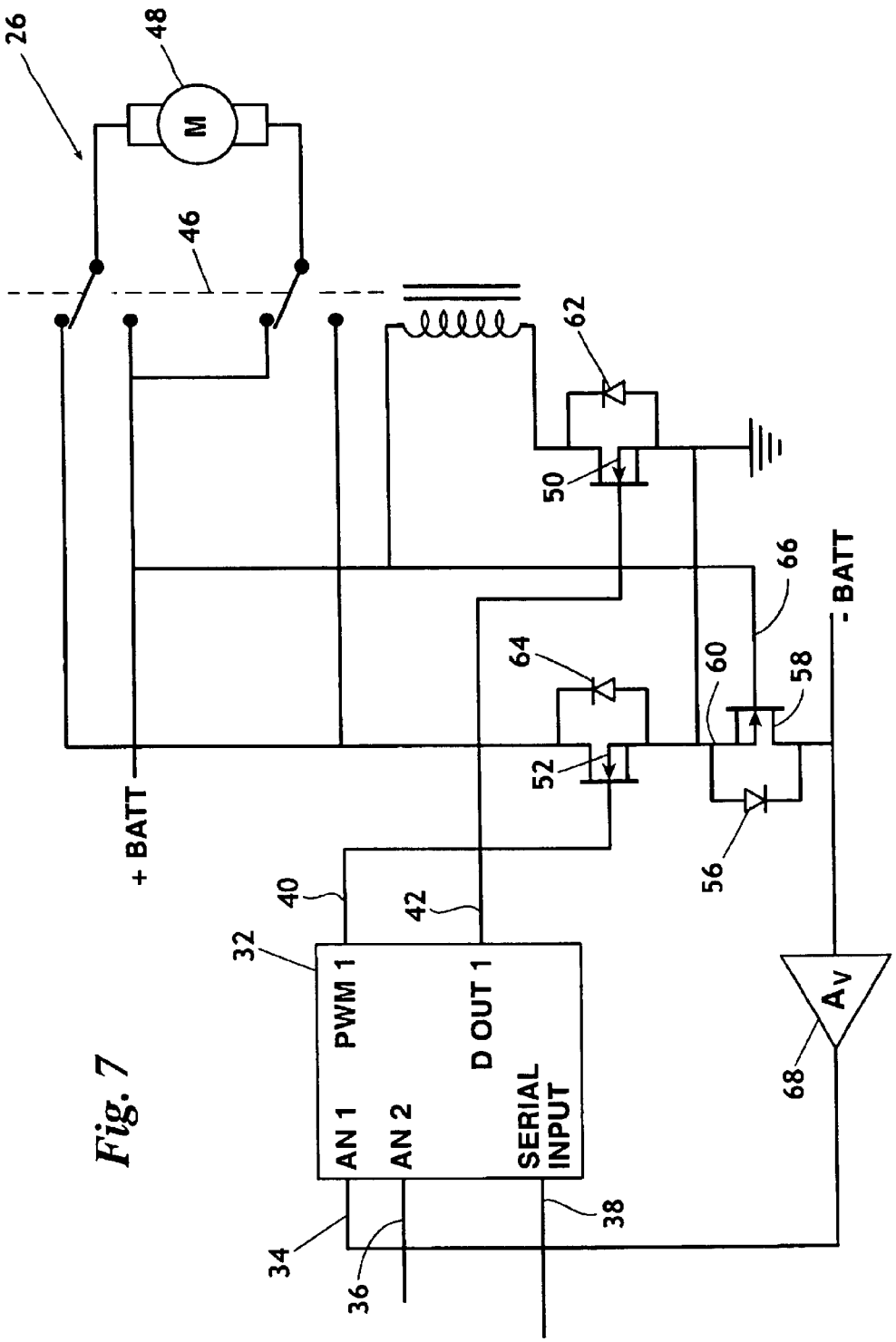
FIG. 7 provides a schematic diagram of a preferred motor controller having the inventive reverse battery protection incorporated therein.

Generally speaking, PWM controllers for trolling motors are well known in the art. An example of a PWM controller 26 having the inventive reverse battery protection is shown in FIG. 7. Preferably, controller 26 possesses a number of desirable traits including: current management to protect the motor and controller in the invent of propeller fouling or other stall condition; minimal parts count to allow packaging of the controller in a relatively small volume; both analog and digital inputs for speed control to allow easy interfacing with a foot pedal, hand control, autopilot, and the like; adaptability to motors of various voltage and current requirements; etc. The motor controller 26 as shown in FIG. 7 possesses these traits which are further described in U.S. Pat. No. 6,507,164, entitled Current Based Power Management for a Trolling Motor, which is incorporated herein by reference.

Continuing with FIG. 7, preferably controller 26 comprises: microprocessor 32 having analog inputs 34 and 36, a pulse width modulator output 40, a digital output 42, and a serial input 38 for receiving motor speed commands from, for example, a foot pedal 30 (FIG. 1); reversing relay 46 for changing the polarity of the power applied to motor 48; relay driver 50 for energizing reversing relay 46 at the direction of output 42; and solid-state switch 52 for energizing motor 48; and reverse battery protection MOSFET 54. Analog input 36 provides an alternate means for providing a motor speed command to controller 26 from an analog signal, such as a potentiometer.

Figure 8:
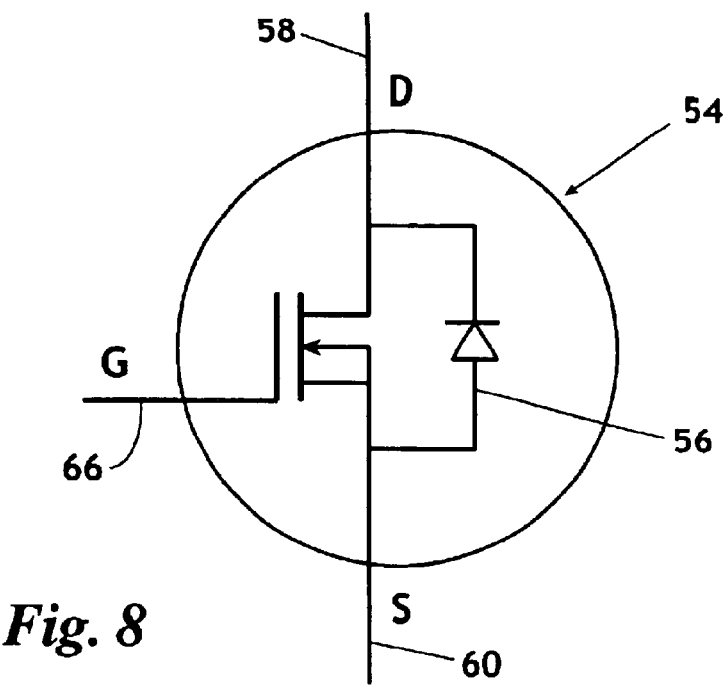
FIG. 8 provides a diagram of an n-channel MOSFET and its intrinsic diode.

As previously mentioned, accidental reversal of the battery leads when the trolling motor is connected to a battery can result in unwanted results ranging from unanticipated activation of the motor to catastrophic failure of the electronic circuitry of the motor controller. With further reference to FIG. 8, as is will known in the art, power MOSFET devices, such as MOSFET 54, contain an intrinsic diode 56. Diode 56 is oriented such that it is reversed biased when the polarity across MOSFET 54 is in the direction which will result in normal current flow through the device, i.e., the cathode towards drain 58 and anode towards source 60 for an n-channel device. As seen in the circuit of FIG. 7, in the absence of reverse battery protection, if a battery is connected backwards such that +BATT is more negative than −BATT, the intrinsic diodes 62 and 64 of MOSFETs 50 and 52, respectively, would be forward biased resulting in unwanted activation of the reversing relay 46 and motor 48. It should be noted that reverse battery protection MOSFET 54 is installed with drain 58 and source 60 reversed so that intrinsic diode 56 is reverse biased, and hence no current will flow, upon an accidental reverse battery connection.

As is also well known in the art, typically the internal geometry of a MOSFET is somewhat symmetric in nature such that the MOSFET will switch in a normal fashion with drain 58 and source 60 reversed. Thus in the circuit of FIG. 7, the gate 66 of MOSFET 54 is connected to +BATT and the drain 58 is connected to −BATT. Thus, when the battery is properly connected, MOSFET 54 is switched to its conductive state. It should be noted that when the battery is properly connected, intrinsic diode 56 is forward biased and thus conducting, diode 56 would typically exhibit a voltage drop of a few hundred millivolts. However, since MOSFET 54 is switched to its conductive state, the voltage drop across device 54 will be defined by the on resistance of device 54, typically a few milliohms, multiplied times the trolling motor current. Preferably a MOSFET 54 is selected having an on-resistance sufficiently low that the IR drop across device 54 is much lower than the turn-on voltage of intrinsic diode 56. With such a device, the loss of energy and production of heat will likewise be smaller than when simply using a diode for reverse battery protection.

Another feature of the present invention lies in the fact that MOSFET 54 has a relatively fixed resistance when driven to its conductive state. In prior art trolling motor controllers, a current sense resistor is often employed to measure the electrical current flowing through the trolling motor. In the event the motor is stalled, or otherwise encounters heavier than expected loads, the output to the trolling motor can be reduced to prevent damage to the power transistor or the motor. In a controller having the inventive reverse battery protection, since the trolling motor current will flow through MOSFET 54, the resistance of MOSFET 54 can be used in lieu of a separate current sensing resistor. Since the voltage across MOSFET 54 will be substantially proportional to the current flowing through the trolling motor, this voltage can be scaled by current sense amplifier 68 to produce a current sense voltage which is of an appropriate range for analog input 34 of microprocessor 32. Microprocessor 32 can thus monitor the current flowing through motor 48. If the current becomes excessive, microprocessor 32 simply reduces the duty cycle at its PWM output 40 to a level which allows monitoring of the overload condition, but which will protect transistor 52 and motor 48. Typically the overload monitoring duty cycle will be in the range of ten percent duty cycle, or less.

Figure 9:
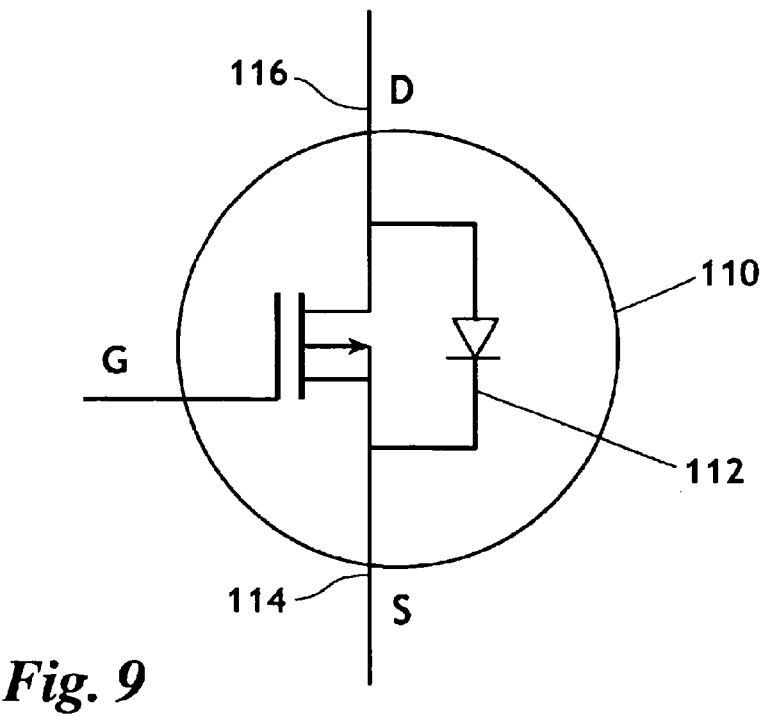
FIG. 9 provides a diagram of a channel MOSFET and its intrinsic diode.

As will be apparent to those skilled in the art, the inventive reverse battery protection scheme could alternatively be accomplished with a p-channel transistor connected in series with the positive battery lead, having its gate terminal connected to the negative lead. Turning to FIG. 9, it can be seen that in p-channel transistor 110, intrinsic diode 112 is reversed, as compared to its n-channel counterpart, having the cathode of the intrinsic diode 112 connected to the source terminal 114, and the anode connected to the drain terminal 116. Thus, when used in a reverse battery protection circuit, MOSFET 110 will be inserted in a circuit in a reverse manner than normal such that intrinsic diode 112 will be forward biased when the battery is properly connected, and reversed biased when the battery leads are reversed.

Figure 3:
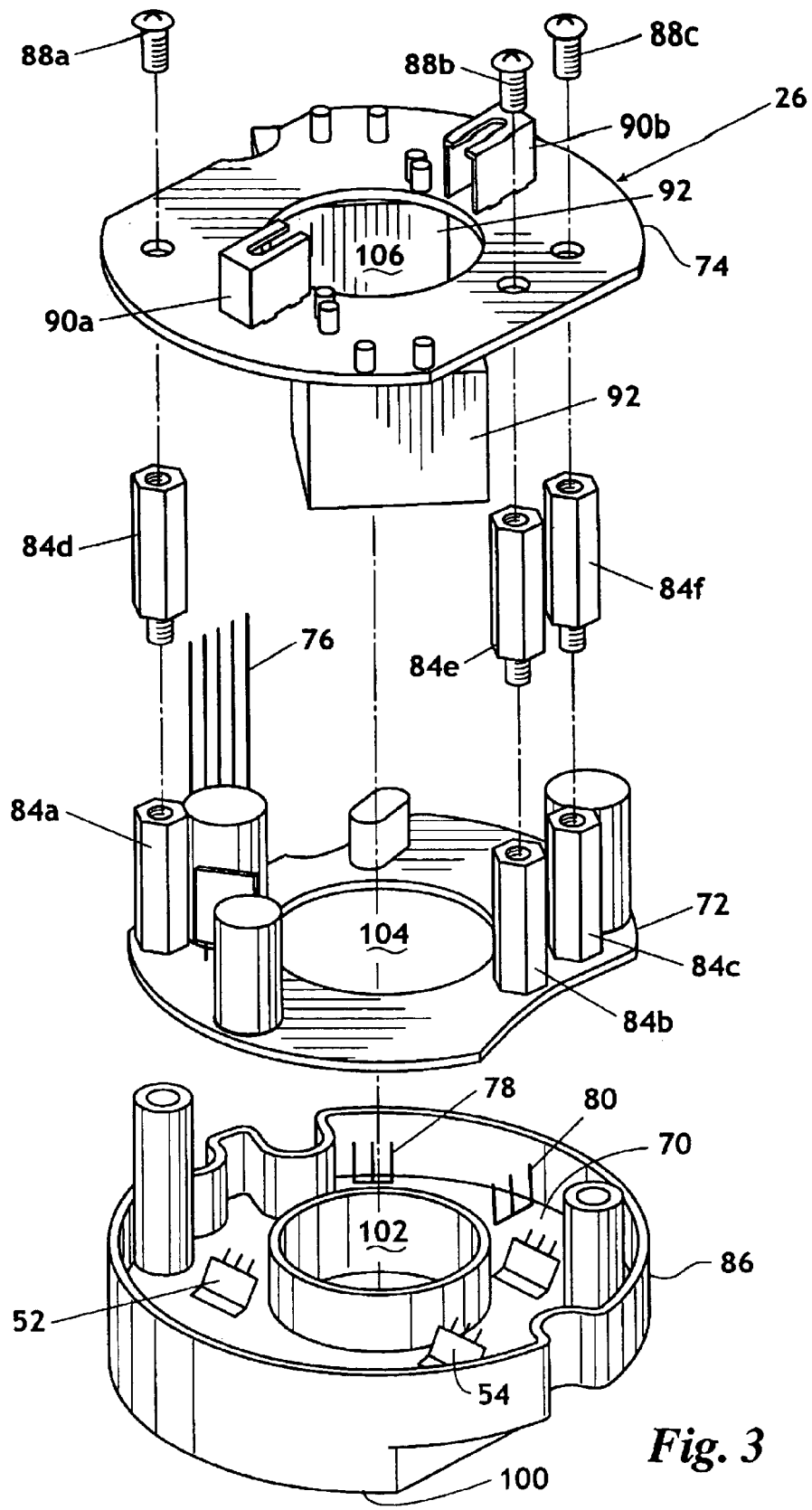
FIG. 3 provides an exploded isometric view of a submerged motor controller having the inventive reverse battery protection.

Referring next to FIG. 3, in the preferred embodiment, the various components of controller 26 are located on three circuit boards 70, 72, and 74. Connectors 76, 78, and 80 electrically interconnect the boards 70, 72, and 74. Spacers 84a–f separate boards 72 and 74 to provide clearance between the boards to accommodate the components mounted thereto.

As will be understood by those familiar with DC motor design, a trolling motor typically includes an armature (not shown) which includes a series of windings wound about an armature shaft. A commutator is mounted coaxial with the armature shaft and acts in concert with a pair of brushes to sequentially apply power to the windings of the armature as the motor rotates to continue urging rotation of the of the armature. By reversing the voltage to the brushes, and hence each winding, the direction of rotation of the armature may be reversed. With further reference to FIG. 7, reversing relay 46 performs the function of reversing the polarity of the power applied to the armature through the brushes. It should be noted that circuit board 74 includes brush housings 90a and 90b which both retain, and provide power to the, brushes (not shown). The brushes in turn interact with the commutator to power the windings of the armature. As a matter of design choice, two single-pole double-throw relays 92a and 92b are used to provide the double-pole double-throw function (as shown with relay 46 of FIG. 7) for reversing. As will be apparent to those skilled in the art, the output of controller 26 is provided directly to the brushes of motor 48 through circuitry provided on board 74 without the need for additional wiring between controller 26 and motor 48. This arrangement substantially reduces the opportunity for the emission of electromagnetic noise.

While the inventive reverse battery protection it suitable for use in any type of trolling motor controller, whether located in the control head or in the motor housing, the preferred embodiment is shown in a trolling motor having a submerged controller. In such an embodiment, preferably, the heat producing components, i.e., transistors 52 and 54, of motor controller 26 are mounted on circuit board 70. Preferably, circuit board 70 is of a heat-sinking type, such as direct copper bonded substrate or insulated metal substrate, and is positioned by board housing 86 to maintain contact for good thermal conduction from the heat producing components to the outer surface of controller assembly 26 (FIG. 2).

Figure 4:
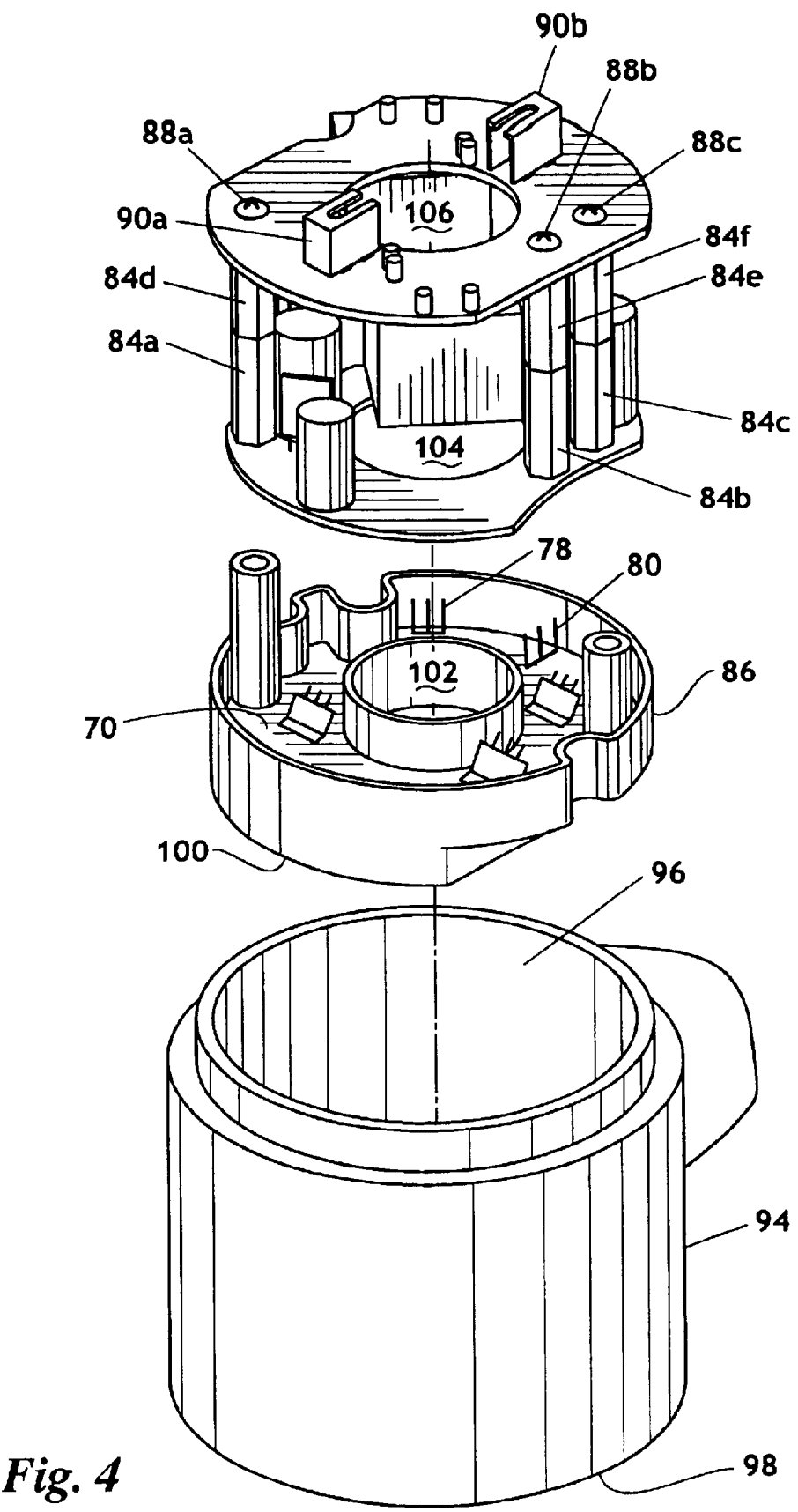
FIG. 4 provides an exploded view of the controller section of the a motor housing FIG. 5 provides an exploded isometric view of a submerged motor controller in a partially assembled state.
Figure 6:
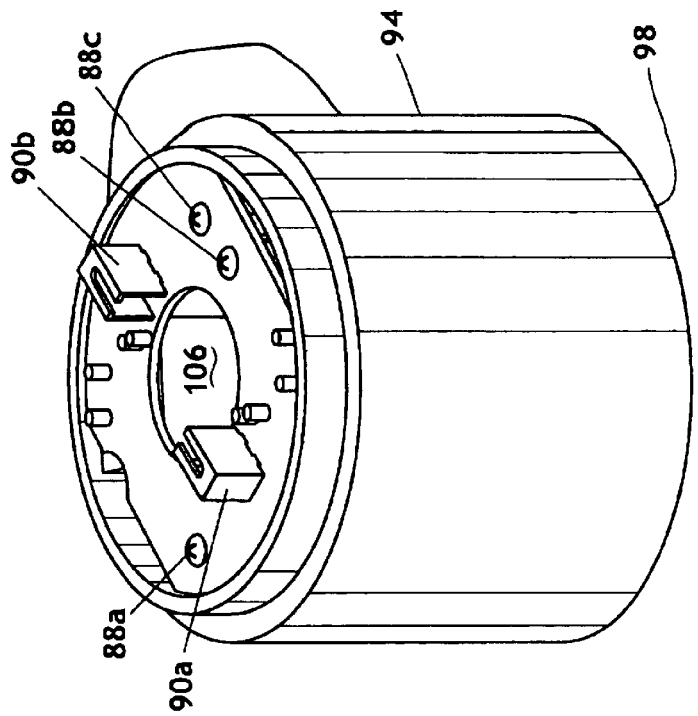
FIG. 6 provides an isometric view of the controller section of a motor housing.
Figure 5:
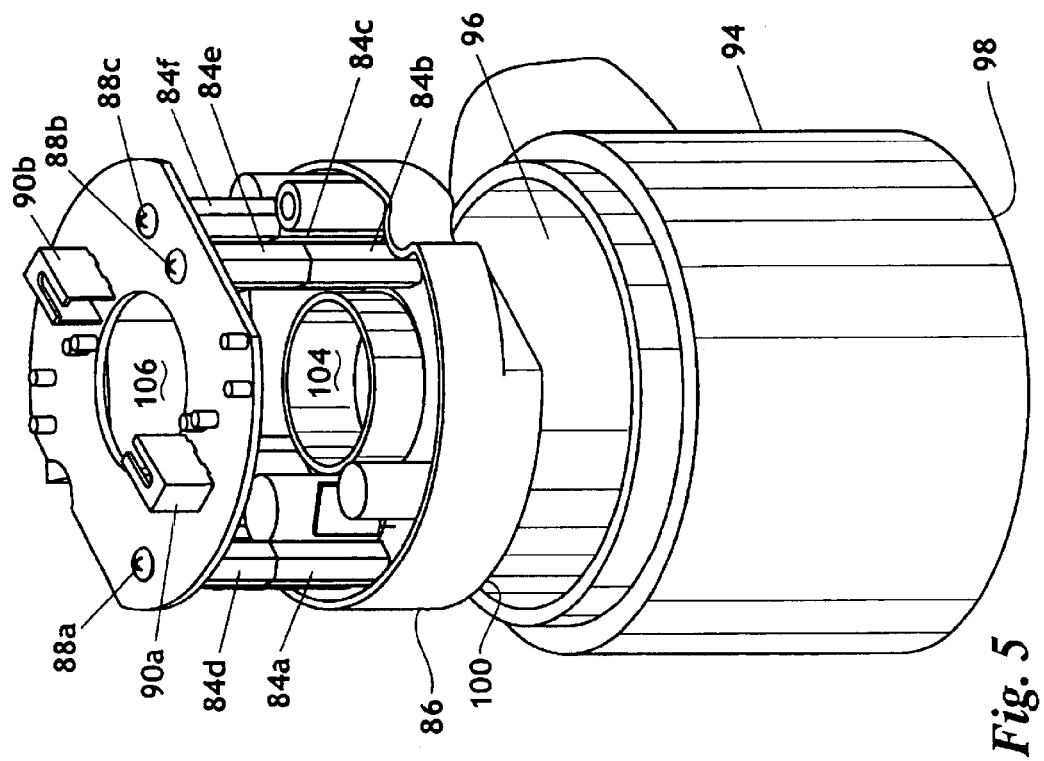

The remaining components of motor controller 26 are preferably located on board 72. With further reference to FIG. 4, 5, and 6, screws 88a–c are received in spacers 84d–f, respectively to secure board 70 to board 72. Boards 72 is then received on connectors 78 and 80 of board 70 to form motor controller 26 which is, in turn, received in controller housing 94. Controller housing 94 includes a forward opening 96 for receiving controller assembly 26 and a rear bulkhead 98 which mates with heat sinking surface 100 of circuit board 70. Board 70 includes aperture 102, board 72 includes aperture 104, board 74 includes aperture 106, and bulkhead 98 includes an aperture (not shown) for passage of the armature shaft when the motor is assembled. When fully assembled, as shown in FIG. 6, the heat-sinking surface 100 (FIGS. 3 and 4)of board 70 is held in physical contact with the rear bulkhead 98 of housing 94 to provide thermal conduction between the heat producing components and the housing 94.

Preferably, controller housing 94 is formed of a material which is a good thermal conductor, most preferably, aluminum.

As will be apparent to those skilled in the art, in certain embodiments of the present invention, other heat producing electronic components may be included in the controller, i.e., voltage regulators, interface circuitry, etc. To the degree any of these components produce heat beyond that which can be readily dissipated in the free air surrounding the component, such components could likewise be located on circuit board 70 to provide thermal conduction to the environment Finally it should be noted that, while the preferred embodiment of the inventive reverse battery protection circuit has been shown and described as incorporated into a trolling motor, the invention is not so limited. The reverse battery protected controller can be used with DC motors in other applications.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention.

What is claimed is:

1. A trolling motor having reverse battery protection comprising:
    an electric motor;
    a first battery lead for connecting the trolling motor to a first terminal of a battery;
    a second battery lead for connecting the trolling motor to a second terminal of a battery;
    a field effect transistor having a source connection, a drain connection, and a gate connection, said drain connection connected to said first battery lead, said source connection in electrical communication with said electric motor, and said gate connection in communication with said second battery lead such that when said first battery lead is connected to said first battery terminal and said second battery lead is connected to said second battery terminal, said field effect transistor will be driven to a conductive state, and when said first battery lead is connected to said second battery terminal and said second battery lead is connected to said first battery terminal, said field effect transistor will be driven to a non-conductive state.

2. The trolling motor of claim 1 wherein said field effect transistor further includes an intrinsic diode having an anode and a cathode, said anode connected to said source connection and said cathode connected to said drain connection.

3. The trolling motor of claim 1 wherein said field effect transistor is an n-channel device and wherein said first battery terminal is a negative battery terminal.

4. The trolling motor of claim 1, wherein the trolling motor includes a current limit protection, the trolling motor further comprising a pulse width modulated motor controller, said motor controller comprising:

a current sense input for measuring the voltage across said field effect transistor, said voltage across said field effect transistor being substantially proportionate to the electrical current flowing through said electrical motor;

a pulse width modulated output for electrically driving said electrical motor, said pulse width modulated output being responsive to said current sense input such that, when the voltage at said current sense input exceeds a predetermined level, the duty cycle of said pulse width modulated output is reduced to an overload monitoring level.

* * * * *